United States Patent
Ota et al.

(10) Patent No.: US 9,331,781 B2
(45) Date of Patent: *May 3, 2016

(54) TWO WAY BURST MODE DIGITAL OPTICAL CABLE COMMUNICATION SYSTEM

(71) Applicant: Go!Foton Corp, Somerset, NJ (US)

(72) Inventors: Yusuke Ota, Mountain Lakes, NJ (US); Kenichiro Takeuchi, North Brunswick, NJ (US)

(73) Assignee: Go!Foton Corporation, Somerset, NJ (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/986,380

(22) Filed: Apr. 25, 2013

(65) Prior Publication Data

US 2014/0321861 A1    Oct. 30, 2014

(51) Int. Cl.
*H04B 10/00* (2013.01)
*H04B 10/25* (2013.01)

(52) U.S. Cl.
CPC .................. *H04B 10/2503* (2013.01)

(58) Field of Classification Search
CPC ............... H04B 10/0775; H04B 10/07951; H04B 10/07953; H04B 10/07955; H04B 10/2537

See application file for complete search history.

(56) References Cited

U.S. PATENT DOCUMENTS

| | | | |
|---|---|---|---|
| 5,841,562 A | 11/1998 | Rangwala et al. | 398/139 |
| 6,592,272 B1 | 7/2003 | Masucci et al. | 398/47 |
| 7,088,921 B1 | 8/2006 | Wood | 398/67 |
| 7,283,753 B2 | 10/2007 | Giles et al. | 398/168 |
| 7,590,109 B2 | 9/2009 | Beshai et al. | 370/360 |
| 7,609,966 B2 | 10/2009 | Gumaste et al. | 398/59 |
| 7,626,916 B2 | 12/2009 | Kim et al. | 370/201 |
| 7,751,712 B2 | 7/2010 | Zhao et al. | 398/72 |
| 7,917,036 B2 | 3/2011 | Ori et al. | 398/136 |
| 8,811,824 B2 * | 8/2014 | Ota et al. | 398/138 |
| 2003/0113118 A1 | 6/2003 | Bartur | 398/139 |
| 2005/0201761 A1 * | 9/2005 | Bartur et al. | 398/197 |
| 2007/0122157 A1 * | 5/2007 | Vandewege et al. | 398/141 |
| 2007/0257194 A1 * | 11/2007 | Mueller | 250/341.8 |
| 2009/0269066 A1 * | 10/2009 | Lee et al. | 398/79 |
| 2012/0148257 A1 * | 6/2012 | Hwang et al. | 398/139 |

* cited by examiner

*Primary Examiner* — Dzung Tran
(74) *Attorney, Agent, or Firm* — Ernest D. Buff & Assoc.; Ernest D. Buff, Esq.; Dave Narasimhan (57) ABSTRACT

A digital burst mode communication system operates at a fixed wavelength for transmission and reception of burst mode signals using a pair of transceivers and a single optical cable. The stray noise level in the system is significantly reduced by use of angled plate absorbers that receive scattered transmission burst signal from a 45 degree partially reflecting mirror. Use of transparent glass ferrule with or without a front surface anti-reflection coating instead of an opaque ceramic ferrule to support optical fiber at a selected location within the transreceiver reduces optical detector signal noise. Isolation of received burst signal from transmitted burst signal is increased to better than 30 dB. The system operates by sending only data bits across the single optical cable without scrambling or encoding preambles, significantly improving the efficiency of high speed communication.

10 Claims, 6 Drawing Sheets

Single Optical Cable Burst-Mode System
according to Present Invention

TWO WAY BURST MODE DIGITAL OPTICAL CABLE COMMUNICATION SYSTEM

CROSS-REFERENCE TO RELATED APPLICATIONS

This application is a continuation-in-part of U.S. application Ser. No. 13/200,005 Filed Sep. 15, 2011, the disclosure of which is incorporated in its entirety by reference thereto.

BACKGROUND OF THE INVENTION

1. Field of the Invention

The present invention relates to digital optical cable communication systems; and, more particularly, to a two way burst mode optical cable communication system for use in optical communication and signal transmission between two optical nodes.

2. Description of the Prior Art

Many patents address issues related to optical communication between nodes in an optical high speed communication network. An Ethernet is a family of computer networking technologies for local area networks (LANs) commercially introduced in 1980. Standardized in IEEE 802.3, the Ethernet has largely replaced competing wired LAN technologies. Systems communicating over an Ethernet divide a stream of data into individual packets called frames. Each frame contains source and destination addresses and error-checking data, so that damaged data can be detected and re-transmitted. The standards define several wiring and signaling variants. The original 10BASE5 Ethernet used coaxial cable as a shared medium. Later the coaxial cables were replaced by twisted pair and fiber optic links in conjunction with hubs or switches. Data rates were periodically increased from the original 10 megabits per second, to 100 gigabits per second. Since its commercial release, the Ethernet has retained a good degree of compatibility. Features such as the 48-bit MAC (Media Access Controller which deals with the higher level issues of medium availability and a Physical Layer Interface) address and an Ethernet frame format have influenced other networking protocols. More recently, a Fast Ethernet is an extension of the existing Ethernet standard. It runs on UTP data or optical fiber cable and uses CSMA/CD (carrier sense multiple access with collision detection) in a star wired bus topology, similar to 10BASE-T where all cables are attached to a hub. It provides compatibility with existing 10BASE-T systems and thus enables plug-and-play upgrades from 10BASE-T. Fast Ethernet is sometimes referred to as 100BASE-X where X is a placeholder for the FX and TX variants. 100BASE-FX is a version of Fast Ethernet over optical fiber. It uses a 1300 nm near-infrared (NIR) light wavelength transmitted via two strands of optical fiber, one for receive (RX) and the other for transmit (TX) function. Maximum length is 400 meters (1,310 ft) for half-duplex connections and 2 kilometers (6,600 ft) for full-duplex over multi-mode optical fiber. Half duplex operation and CSMA/CD (carrier sense multiple access with collision detection) do not exist in 10 GbE. 100BASE-FX uses the same 4B5B encoding and NRZI line code that 100BASE-TX does. 100BASE-FX should use SC, ST, LC, MTRJ or MIC connectors with SC being the preferred option. 100BASE-FX is not compatible with 10BASE-FL, the 10 MBit/s version over optical fiber. 100BASE-SX is a version of Fast Ethernet over optical fiber. It uses two strands of multi-mode optical fiber for receive and transmit. It is a lower cost alternative to using 100BASE-FX, because it uses short wavelength optics, which are significantly less expensive than the long wavelength optics used in 100BASE-FX. 100BASE-SX can operate at distances up to 550 meters (1,800 ft). 100BASE-SX uses the same wavelength as 10BASE-FL, the 10 Mbit/s version over optical fiber. Unlike 100BASE-FX, this allows 100BASE-SX to be backwards-compatible with 10BASE-FL. Because of the shorter wavelength used (850 nm) and the shorter distance it can support, 100BASE-SX uses less expensive optical components (LEDs instead of lasers) which makes it an attractive option for those upgrading from 10BASE-FL and those who do not require long distances. 100BASE-BX is a version of Fast Ethernet over a single strand of optical fiber (unlike 100BASE-FX, which uses a pair of fibers). Single-mode fiber is used, along with a special multiplexer, which splits the signal into transmit and receive wavelengths. The two wavelengths used for transmit and receive is 1310/1550 nm. The terminals on each side of the fiber are not equal, as the one transmitting "downstream" (from the center of the network to the outside) uses the 1550 nm wavelength, and the one transmitting "upstream" uses the 1310 nm wavelength. Distances can be 10, 20 or 40 km 100BASE-LX10 is a version of Fast Ethernet over two single-mode optical fibers. It has a nominal reach of 10 km and a nominal wavelength of 1310 nm. It is described in IEEE 802.3-2005 Section 5 chapter 58.

U.S. Pat. No. 5,841,562 to Rangwala, et al. discloses a bidirectional modular optoelectronic transceiver assembly. This bidirectional modular optoelectronic transceiver assembly comprises a pair of interconnectable modules operating at the same wavelength. The transceiver comprises a transmitter module and a receiver-splitter module, which is plugged into a self-aligning socket of the transmitter module. The transmitter module includes a light source lensed to an opening in the socket, and the receiver-splitter module includes a ferrule, which is plugged into the socket. The ferrule carries an optical fiber so that one end of the fiber is optically coupled to the light source. This coupling enables an outgoing optical signal to be partially transmitted to a fiber pigtail located at the opposite end of the ferrule. A splitter is located at the other end of the fiber so that an incoming optical signal on the fiber pigtail is partially reflected to a light detector. There are no optical absorbers in the transceiver and noise from any stray coupling of transmitted signal and/or received signal cannot be avoided.

U.S. Pat. No. 6,592,272 to Masucci, et al. discloses burst mode transmission over multiple optical wavelengths. This method and system contemplates use of burst mode transmission on multiple optical wavelengths. In a passive optical network, a synchronization signal is transmitted from a central terminal to remote terminals, and burst data signals are transmitted from remote terminals to the central terminal. A first group of remote terminals transmits burst data signals in respective timeslots that are synchronized to the received synchronization signal and multiplexed at a first optical wavelength. A second group of remote terminals transmits burst data signals in respective timeslots that are synchronized to the received synchronization signal and multiplexed at a second optical wavelength. The timeslots are synchronized and phase aligned with each other such that optical crosstalk interference between adjacent optical wavelengths is avoided and each wavelength can be spectrally spaced as close as possible to adjacent wavelengths. This system uses multiple wavelengths and does not use a single wavelength for data communication between two transceivers using a single optical fiber.

U.S. Pat. No. 7,088,921 to Wood discloses a system for operating an Ethernet data network over a passive optical network access system. This data communications system provides multiple logical channels on a passive optical network (PON) using subcarrier multiple access (SCMA). A single PON shared bus is subdivided into several logical busses, so that each of a plurality of Ethernet Network Interface Cards (NICs) can communicate with the head-end on its own logical bus. The logical busses are configured so that the individual NICs can communicate with the head-end independently of each other, thereby assuring that collisions between NICs cannot take place. The PON includes multiple optical network units (ONU) which each communicate with a head-end over a logical channel. Collisions among upstream transmissions are thereby avoided and high speed Ethernet service over large distances is made possible. The network has many logical buses with each bus having its own Ethernet Network Interface Card, and does not connect two transceivers using a single optical fiber communicating data using a single frequency.

U.S. Pat. No. 7,283,753 to Giles, et al. discloses a system and method for WDM communication with interleaving of optical signals for efficient wavelength utilization. In this system and method of optical communication, optical signals are generated in multiple wavelength channels. Each optical signal is passively transported from an origination node of a network to a destination node. The destination node is determined by the signal wavelength. For at least some signals, the passive transport includes transport through a branch point of the network, such that the signal wavelength determines the output branch through which the signal is routed. The signals are generated according to a schedule devised to substantially prevent the concurrent arrival, at the same destination node, of signals having the same wavelength but coming from different origination nodes. This WDM system uses multiple frequencies for communication and does not use a single frequency for communication in a single fiber connected to two transceivers.

U.S. Pat. No. 7,590,109 to Beshai, et al. discloses data burst scheduling. A scheduling method and apparatus for transfer of data bursts in a network comprises electronic edge nodes interconnected by bufferless core nodes. Each edge node comprises a source node and a sink node, and each core node comprises several bufferless space switches operating in parallel. Each space switch has a master controller and one of the master controllers in a core node functions as a core-node controller. Each master controller has a burst scheduler for computing a schedule for transfer of data bursts, received from source nodes, to respective destination sink nodes. A core-node controller receives requests for bitrate allocations from source nodes and assigns each request to one of the master controllers of the core node. The scheduler determines schedules for concatenated reconfiguration periods. Alternatively, parallel schedulers determine schedules for overlapping reconfiguration periods. This system does not use a single optical fiber connecting two transceivers without additional burst period scheduling controllers.

U.S. Pat. No. 7,609,966 to Gumaste, et al. discloses a method and system for time-sharing transmission frequencies in an optical network. The optical communication system includes an optical ring, a hub node, and a plurality of local nodes. The hub node and the plurality of local nodes are coupled to the optical ring. The hub node is capable of receiving traffic over the optical ring from the plurality of local nodes on a transmitting wavelength and of transmitting traffic over the optical ring to the local nodes on a receiving wavelength. The plurality of local nodes are capable of adding traffic to and drop traffic from the optical ring and at least one local node is capable of adding traffic to the optical ring by determining whether any other local node is transmitting at the transmitting wavelength. The local node adding traffic is also capable of transmitting a request message to the hub node requesting use of the transmitting wavelength, in response to determining that no other local node is transmitting at the transmitting wavelength. Additionally, the local node adding traffic is further capable of receiving a grant message from the hub node and, in response to receiving the grant message from the hub node, transmitting traffic at the transmitting wavelength. In this system, the hub node allows the local node to transmit data only when no other node is transmitting in the optical ring network. This system does not use a single dedicated optical fiber connected to a pair of transceivers for communication between two nodes that are connected.

U.S. Pat. No. 7,626,916 to Kim, et al. discloses a method and system for crosstalk cancellation. Signals propagating in one communication channel can generate crosstalk interference in another communication channel. A crosstalk cancellation device can process the signals causing the crosstalk interference and generate a crosstalk cancellation signal that can compensate for the crosstalk when applied to the channel receiving crosstalk interference. The crosstalk cancellation device can include a model of the crosstalk effect that generates a signal emulating the actual crosstalk both in form and in timing. The crosstalk cancellation device can include a controller that monitors crosstalk-compensated communication signals and adjusts the model to enhance crosstalk cancellation performance. The crosstalk cancellation device can have a mode of self configuration or calibration in which defined test signals can be transmitted on the crosstalk-generating channel and the crosstalk-receiving channel. This system uses a compensator to remove the crosstalk and does not use a single fiber without additional hardware.

U.S. Pat. No. 7,751,712 to Zhao, et al. discloses passive optical network and data communication method thereof. This Passive Optical Network includes: an Optical Line Terminal, an Optical Distribution Network, and an Optical Network Unit or an Optical Network Terminal, wherein the Optical Line Terminal is adapted to exchange data with the Optical Network Unit or the Optical Network Terminal by using an optical module via the Optical Distribution Network. The optical module is an optical module sending data in a continuous mode. Further, a method for data communication based on the Passive Optical Network includes: sending data by using an optical module sending data in a continuous mode; receiving the data by an optical module based on a set optical power threshold of data "0" and a set optical power threshold of data "1". The data is not transferred through the optical fiber in the burst mode but by adjusting the power of a single frequency continuous optical signal.

U.S. Pat. No. 7,917,036 to Ori, et al. discloses bi-directional optical module. This optical transceiver includes a bi-directional optical subassembly with a printed circuit board which transmits and receives light for the bi-directional optical subassembly and an outer casing which covers the bi-directional optical subassembly and the printed circuit board. The bi-directional optical subassembly includes: a laser diode; a photodiode; a stem on which to laser diode and the photo diode are mounted; a cap, which cooperates with the stem to seal the laser diode and the photodiode; and a crosstalk reducing structure for reducing optical and/or electric crosstalk. The crosstalk reducing structure may include a layer, which is formed on an inner surface of the cap and is able to absorb an infrared ray. The crosstalk reducing structure includes a block, which is disposed between the laser diode and the photodiode, and is able to physically prevent stray light from traveling from the laser diode to the photodiode. The single fiber operates in WDM system wherein a single mode optical fiber is used for transmitting and receiving on different wavelengths, 1310 nm and 1490 nm and does not use a common wavelength for communication.

US Patent Application 20030113118 to Bartur discloses a smart single fiber optic transceiver. This fiber optic transceiver is adapted for use in an optical fiber data transmission system and is capable of detecting fiber connection problems and providing visual or other indications of a problem. The fiber optic transceiver contains a fiber interface, a receiver, a transmitter, and a microcontroller. The microcontroller controls the transmitter to modulate the laser power to transmit test data and the transceiver includes circuitry and microcode to detect fiber connection problems, including reflection and cross connections. This enables trouble shooting during installation and/or reconfiguring the connection automatically, in response to a connection problem, and provides a physical layer link. This transceiver system uses a microcontroller coupled to the transmitter and receiver and providing a modulated power control signal to the laser driver during a test mode to transmit test data and monitoring received signals to detect connection problems.

There remains a need in the art for a optical communication high speed communication that uses a single fiber using transceiver on both ends of the optical fiber communicating using a single wavelength without adding preamble and delimiter information thereby providing faster more efficient communication in a high speed network.

SUMMARY OF THE INVENTION

The present invention provides a pair of transceivers connected at each end of an optical fiber that communicate to each other using burst mode single wave communication. Only actual data is communicated through the optical fiber without additional preamble and delimiters, using a single wavelength. The single wavelength optical radiation from the transmitter of the transceiver is the carrier. Data may be encoded as an amplitude signal or frequency signal and delivered as a signal burst. The data sent is received by the transceiver at the other end of the optical fiber. A photocell converts the received optical signal to an electrical signal. The transceivers comprise a partially transparent 45 degree mirror which functions to deliver the transmitted optical radiation. The same partially transparent 45 degree mirror directs the received optical signal received from the optical fiber to a photocell located perpendicular to the transmitted optical signal. Any stray radiation present due to the transmitted signal is directed to a black body cavity, which consists of two or more carbon black coated plates positioned at an angle to each other so that the stray optical noise bounces back and forth resulting in total absorption thereof. The optical fiber that receives optical signal from this 45 degree reflective arrangement is supported in a standard ferrule. Use of a standard ferrule made from alumina or zirconia results in reflections at the front face of the ferrule that direct unfocused divergent beams of varying wavelengths to the optical detector, causing interference. Both alumina and zirconia are not optically transparent and a polished surface of the ferrule acts as reflector of stray radiation causing interference. The subject invention uses a transparent glass ferrule for supporting the optical f and the front surface is coated with an antireflective (AR) coating. This arrangement minimizes or eliminates the entry of an unfocused reflected beam into the optical detector, thereby reducing or eliminating interference. Surprisingly, collision of signals from the two transceivers located at either end of the optical fiber is avoided. Due to the short duration of the burst pulse, the likelihood that both transceivers emit transmission at the same time is extremely low. Moreover, the transmitted burst signals travel in opposite directions and do not alter the signals. This phenomenon differs from optical signals that travel in the same direction, such as those produced in a ring optical network. Advantageously, with this arrangement, the need for commonly used handshaking and timing protocols is avoided.

The transceiver comprises a light source, which may be laser or an LED emitting radiation at the selected wavelength and comprises pulse amplitude modulated light pulses. The light passes through the partially transparent 45 degree mirror and is coupled with the optical fiber using a ferrule. Any reflected optical radiation signal is directed to the optical blackbody absorber, thereby preventing crosstalk between the transmitted optical signal and any received optical signal. Clearly, the transmitted signal and received signal travel through the optical fiber in opposite directions and there is no interaction between the two signals. This would not be the case for optical signals traveling in a ring type configuration. In that case, the waves travel along the same direction and one optical signal wave can build or diminish another optical signal wave, creating a collision problem. The optical fiber may carry the optical signal in a single mode or multimode transmission mode.

BRIEF DESCRIPTION OF DRAWINGS

The invention will be more fully understood and further advantages will become apparent when reference is had to the following detailed description and the accompanying drawings, in which:

FIG. 1(a) to FIG. (1d) illustrate a conventional communication system, wherein

DESCRIPTION OF THE PREFERRED EMBODIMENTS

The two way burst mode digital optical cable works just in the same manner as two metal coaxial cables. The digital signals communicating between two node points do not need to be scrambled or encoded, unlike the signal which is required in typical high speed communication practice. That is, no scramble or encoding is needed. The conventional optical communication data signal must be encoded or scrambled. In addition, a significant length of digital bits is consumed to stabilize the transmit and receipt operations. In the system of the present invention, a special burst mode transmission and receiving procedure is used wherein the first bit is valid data. The signal transmission performance is realized when burst mode single fiber is employed, using two unique transceiver optical units, one at each end of the fiber, which may be identical transceivers.

A pair of metal cables may be used for communication between nodes using burst mode signals. However, the cables need to be only of short length, and communication fails when long distances are involved.

Use of a single optical fiber link between two nodes is known in the art as indicated in 100BASE-BX Fast Ethernet specification. The signal is transmitted through a single strand of optical fiber (unlike 100BASE-FX, which uses a pair of fibers). Typically, a single-mode fiber is used, along with a special multiplexer, which splits the signal into transmit and receive wavelengths. The two wavelengths used for transmit and receive are 1310/1550 nm. The terminals on each side of the fiber are not equal, as the one transmitting 'downstream' (from the center of the network to the outside) uses the 1550 nm wavelength, and the one transmitting 'upstream' uses the 1310 nm wavelength. The use of two wavelengths represents a WDM communicating protocol.

The comparison of a burst mode optical link in contrast with a standard optical linked encoded scrambled communication and metal two cable communication is shown in Table I below.

TABLE I

| Communication Details | Burst mode Optical | Standard Optical | Metal Cable |
|---|---|---|---|
| Data Pattern | Any | Encoded/scrambled | Any |
| Distance | Long | Long | Short |
| Data Rate | High | High | Depends on distance |
| Two Way Communication | Single Fiber Same Wavelength | Single Fiber WDM | Two Cables |

Figures 1, 1A, 1B, 1C, 1D:
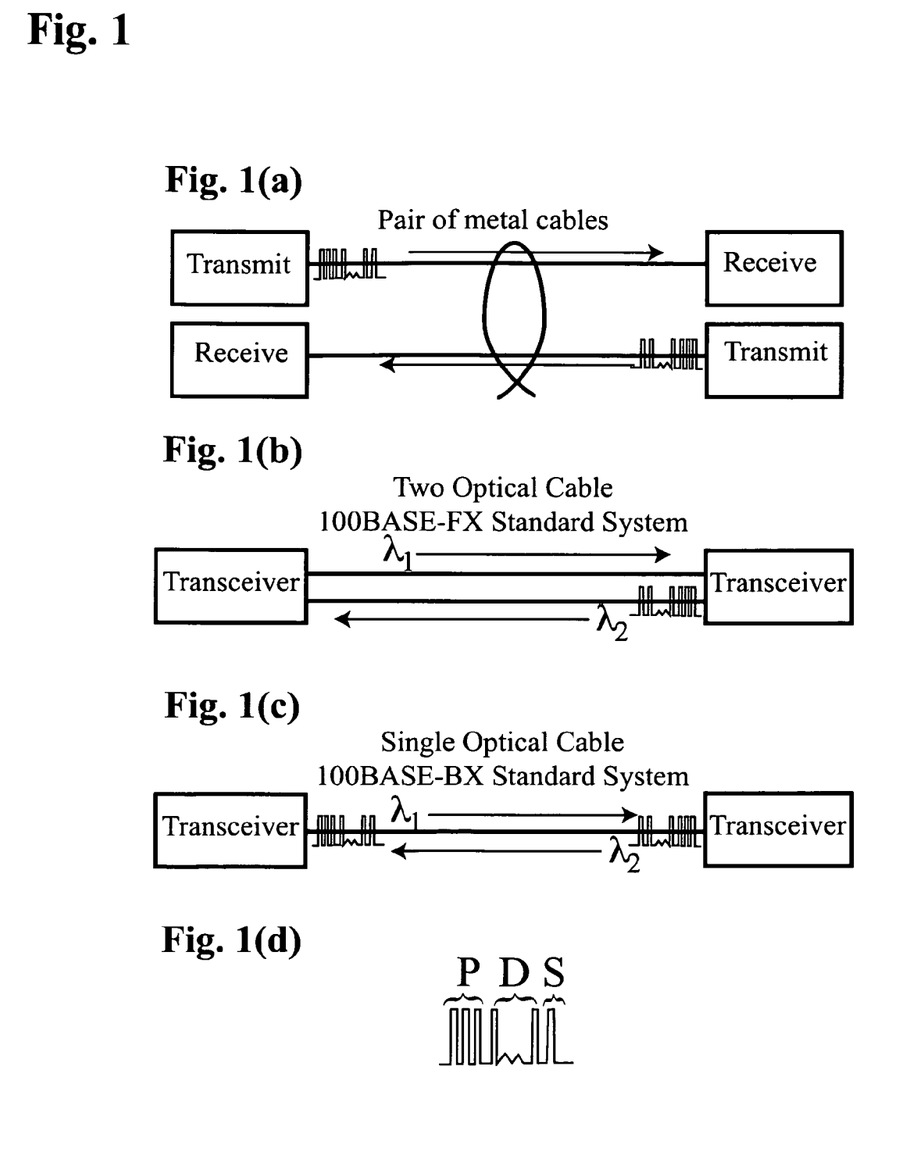
FIG. 1(a) illustrates a two wire metallic cable system.
FIG. 1(b) illustrates a two optical fiber transceiver system.
FIG. 1(c) illustrates a one optical fiber two wavelength system and FIG. 1(d) illustrates the waveform of the communication signal.

FIGS. 1(a) to 1(d) illustrate a conventional communication system, wherein FIG. 1(a) illustrates a two wire metallic cable system for communicating the transmitted and received signals from two nodes that are connected. The communication performance in this two metallic cable system is realized only when a short metal cable is used. Non-formatted digital patterns can also be transmitted via a metal coaxial cable. However, by using metal coaxial cable, 2 cables are needed to carry out 2-way communication. FIG. 1(b) illustrates a two optical fiber transceiver system wherein signals similar to FIG. 1(a) are communicated and both ends of the fibers are connected to transceivers instead of two separate transmission and reception devices. FIG. 1(c) illustrates a one optical fiber that is connected to two transceivers and the two way communication is conducted using two separate wavelengths in a so called WDM system. FIG. 1(d) illustrates the waveform of the communication signal in all these conventional methods and the communication waveform includes the preamble pulse P that sets up the communication is about to begin, the network address to which the signal is directed, followed by the data portion D and a stop bit S to indicate end of communication. All these communications are in the burst mode.

Figure 2:
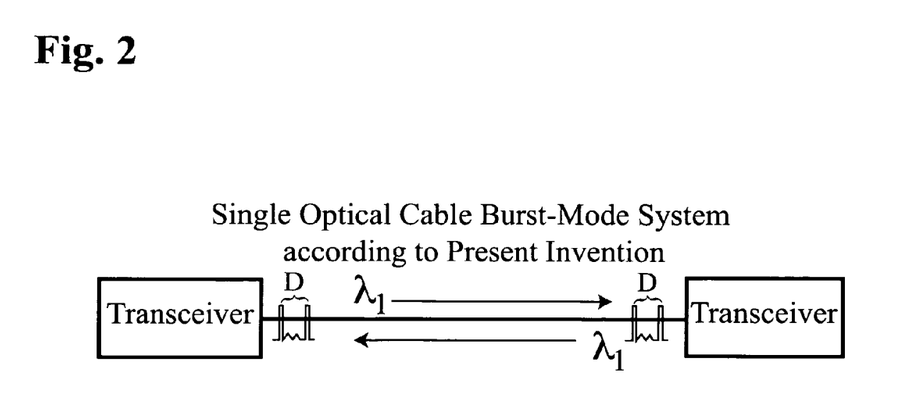
FIG. 2 illustrates the burst mode single fiber optical fiber communication system according to the subject invention.

FIG. 2 illustrates the burst mode single fiber optical fiber communication system according to the subject invention. The optical fiber is connected to two transceivers at each end and the two way communication is accomplished in the burst mode. Both the transmitted and received signals are sent at the same wavelength $\lambda_1$. This wavelength is the carrier wave and the optical signal comprises light pulses. The data is sent without any preamble bits or stop bits as shown by the signal data wave form D, that is, the first bit valid (FBV) burst-mode transceiver makes it possible to transmit and receive a digital data pattern in any format (even a single pulse). The transceivers have absorption of optical stray signals. The details of the optical absorption system are detailed in FIGS. 3 and 4.

Figure 3:
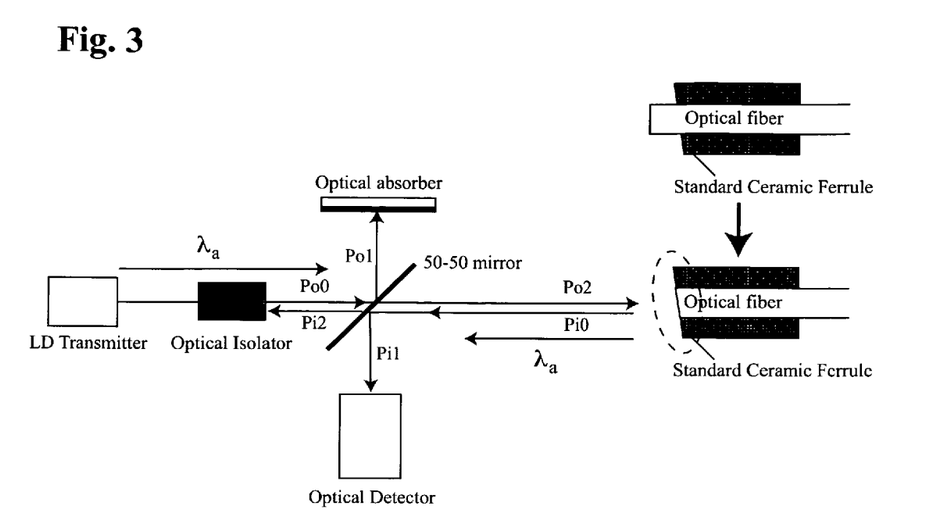
FIG. 3 illustrates the details of a non crosstalk single wavelength transceiver provided at both ends of the single optical fiber.

FIG. 3 illustrates the details of a non-crosstalk single wavelength transceiver that is provided at both ends of the single optical fiber. The Non-crosstalk optical transceiver is composed of a LD transmitter, an optical isolator, 50-50 splitting mirror, an optical absorber and an optical detector. The optical fiber is held within a standard ceramic ferrule, which has an aperture that supports the optical fiber at a chosen location. The optical absorber utilized is a carbon black coating on a glass plate and is capable of absorption of majority of Po1. Both wavelengths of incoming and outgoing optical signals are the same wavelength, $\lambda a$. The optical signal transmitted from the LD Transmitter Po0 is split to Po1 and Po2 by the 50-50 splitting mirror. Po1 is absorbed by the optical absorber (coated with carbon black) and vanishes, while Po2 goes into an optical fiber. The incoming optical signal Pi0 (the same wavelength, $\lambda a$) is split to Pi1 and Pi2 by the 50-50 splitting mirror. The optical isolator absorbs Pi2 and Pi1 going to the Optical Detector. In this configuration, the isolation between incoming and outgoing optical signals is >30 dB (1000 times).

Figure 4:
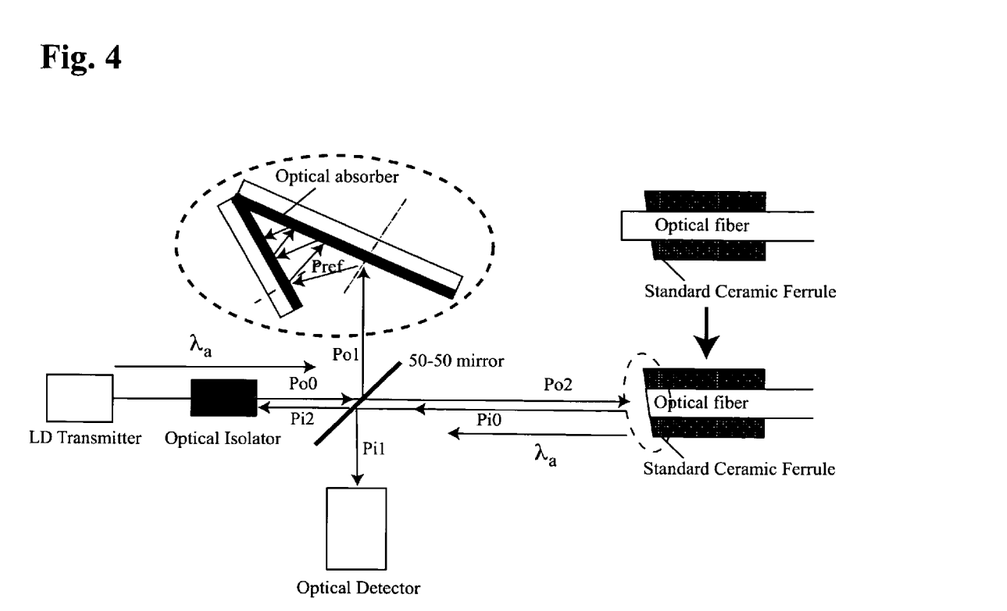
FIG. 4 illustrates the details of the absorber arrangement for the absorption of optical stray signal reducing or eliminating crosstalk.
Figure 5:
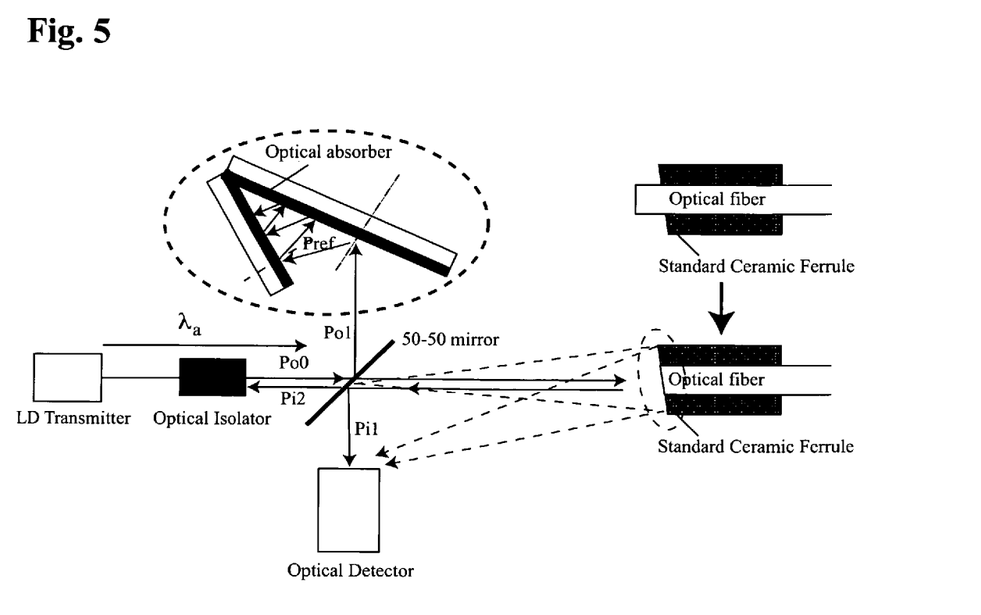
FIG. 5 illustrates the details of the unfocused stray radiation impinging on the front surface of the opaque ceramic ferrule, reflecting radiation to the optical detector and creating noise in the optical detector signal.

FIG. 4 illustrates the details of the absorber arrangement for the absorption of optical stray signal reducing or eliminating crosstalk. In this case, the absorber comprises two carbon black coated glass sheets set at an angle to each other so that the reflected optical signal Pref is bounced between the two plates ensuring complete absorption. There are two absorbing plates to form a black body cavity and by this arrangement, the reflected optical signal has almost no chance to be reflected back to the optical detector and the reflected optical stray signal power banishes completely during multiple reflection paths. The optical fiber is held within a standard ceramic ferrule, shown by the arrow, that has an aperture, which supports the optical fiber at a chosen location. Reflections of unfocused beam impinges on the front face of the ferrule may enter the detector creating noise on the signal generated by the optical detector. In general, the standard ceramic ferrule is made from a non transparent ceramic such as alumina or zirconia and the fiber passes through an aperture in the ferrule. A polished front surface of the ferrule acts as a mirror and reflects FIG. 5 illustrates the details of the unfocused stray radiation that impinges on the front surface of the opaque ceramic ferrule and reflects radiation to the optical detector, creating noise in the optical detector signal. The optical fiber is held within the aperture of a standard ceramic ferrule that supports the optical fiber at a chosen location. The unfocused stray radiation impinges on the front face of the ferrule, as shown by the dotted lines. Since the standard ceramic ferrule is made from an optically opaque material such as alumina or zirconia, a polished surface of the front face of the ferrule reflects that unfocused stray radiation to the detector, as shown. This reflection produces noise in the optical detector signal and reduces the reliability of the system. This problem is solved by the arrangement described below with reference to FIG. 6.

Figure 6:
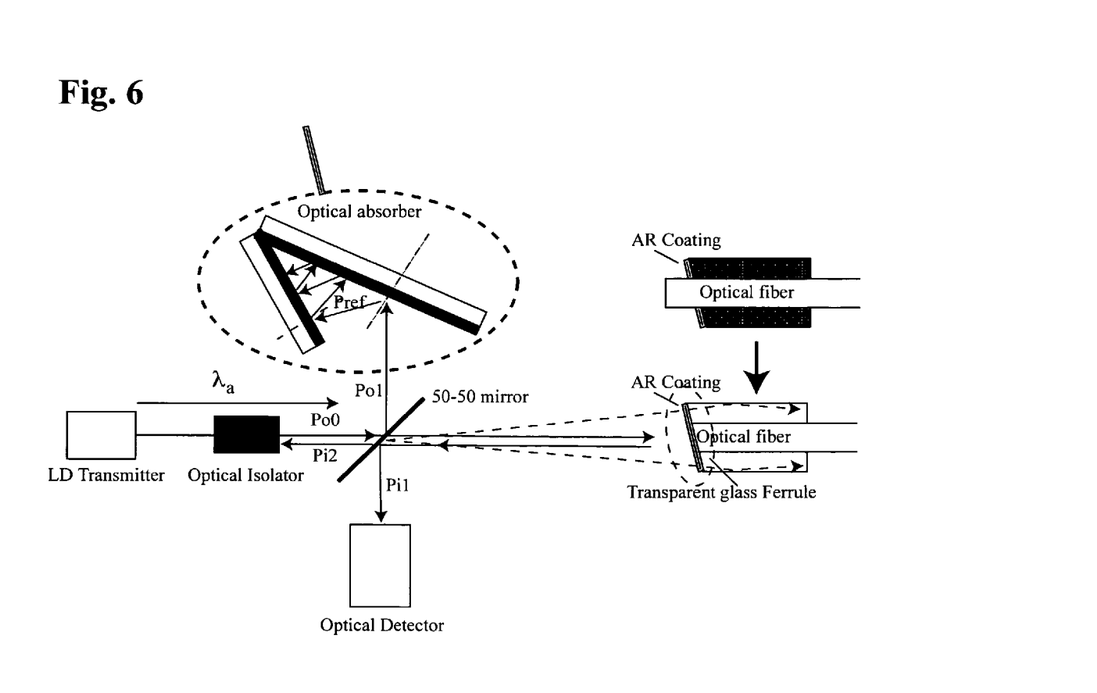
FIG. 6 illustrates the details of the unfocused stray radiation that impinges on the front surface of the transparent glass ferrule and passes through without reflecting radiation to the optical detector, thereby minimizing or eliminating noise in the optical detector signal.

FIG. 6 illustrates the details of the unfocused stray radiation that impinges on the front surface of the transparent glass ferrule and passes through without reflecting radiation to the optical detector, thereby minimizing or eliminating noise in the optical detector signal. The opaque ferrule is replaced by a transparent glass ferrule, as indicated by the replacement arrow. The optical fiber is held within the aperture of a transparent glass ferrule that supports the optical fiber at a chosen location. The unfocused stray radiation impinges on the front face of the transparent glass ferrule, as shown by the dotted lines. Since the glass ferrule is transparent, the unfocused stray radiation passes through the glass ferrule without reflection to the optical detector. It stays within the glass ferrule and does not enter the optical fiber contained within the glass ferrule. The front surface of the glass ferrule may be coated with an anti reflection (AR) coating to minimize any stray reflection directed towards the optical detector. High integrity signal transmission is thereby achieved.

The two way burst mode optical cable communication system comprises, in combination, the following salient features:

1. A single optical communication cable either single mode or multimode connected to two transceivers, one at the proximal end and one at the distal end;
2. The transceivers comprising a laser or light emitting diode emitting a burst pulse of transmitted burst signal at the same wavelength either in amplitude modulated mode or frequency modulated mode;
3. The transceiver having a photoelectric optical detector to receive an incoming signal, transmitted through said optical fiber from the distal transceiver;
4. The transceiver having a 45 degree partially reflecting mirror through which transmitted burst signal passes into optical fiber;
5. The 45 degree mirror directing the received signal to a photoelectric optical detector;
6. Any cross talk signal generated from the transmission signal at the 45 degree mirror is directed away from the photoelectric optical detector to an optical absorber;
7. The absorber comprising a pair of acute angle inclined carbon black coated plates forming the black body cavity attenuating stray optical noise in a few reflections;
8. The optical fiber being supported within a glass ferrule at the selected location for optical signal transmission, said glass ferrule minimizing or eliminating reflection of unfocused stray radiation to the photoelectric whereby reliable high-speed communication is established between two optical nodes without the need for preamble pulses such as scrambling or encoding and delimiter stop bits.

The invention herein described above connects two optical nodes with a single optical cable operating at the same wavelength for transmitting and receiving burst mode signals. The concept may be extended to the connection of many nodes, two at a time, creating networks for high speed data communication.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A two way burst mode optical cable communication system, comprising:

a. a single optical communication cable connected between two optical transceivers, one at the proximal end and one at the distal end, operating at a constant wavelength for transmission of burst mode optical signals and receipt of burst mode optical signals with first bit of burst mode optical signal being valid data;
    b. said transceivers having a transmission section, a 45 degree partially reflecting mirror, a receiving photoelectric section perpendicular to the transmission direction and an optically transparent glass ferrule for connection to and support of said optical fiber at a selected location wherein stray noise is transmitted through transparent ferrule without reflection to the detector,
    c. said burst mode optical signal transmitted from said transceiver passing through an optical isolator followed by said 45 degree partially reflecting mirror into said single optical fiber and any stray radiation from the 45 degree partially reflecting mirror being directed to a black body for the absorption of stray optical signals;
    d. said received burst mode optical signal from said optical fiber being reflected by said 45 degree partially reflecting mirror to a photoelectric detector and any stray optical radiation being blocked by said optical isolator;
    whereby reliable high-speed communication is established between two optical nodes from opposite sides of optical fiber optical signals traveling in opposite directions without optical signal alteration and or the need for preamble pulses such as scrambling or encoding and delimiter stop bits.

2. The two way burst mode optical cable communication system as recited by claim 1, wherein said optically transparent glass ferrule has anti reflection coating at the front face facing the photoelectric optical detector.

3. The two way optical cable communication system as recited by claim 1, wherein said absorber comprises a pair of acute angle inclined carbon black coated plates attenuating stray optical noise in few reflections.

4. The two way optical cable communication system as recited by claim 1, wherein the optical fiber is a single mode optical fiber.

5. The two way optical cable communication system as recited by claim 1, wherein the optical fiber is a multi mode optical fiber.

6. The two way optical cable communication system as recited by claim 1, wherein said transceiver emits a burst mode laser signal.

7. The two way optical cable communication system as recited by claim 1, wherein said transceiver emits a burst mode light emitting diode signal.

8. The two way optical cable communication system as recited by claim 1, wherein isolation of received burst signal to transmitted burst signal is greater than 30 dB or 1000 times.

9. The two way optical cable communication system as recited by claim 1, wherein the burst mode optical signal is in amplitude modulated mode.

10. The two way optical cable communication system as recited by claim 1, wherein the burst mode optical signal is in frequency modulated mode.

* * * * *